United States Patent
Hara et al.

(10) Patent No.: US 9,305,573 B2
(45) Date of Patent: Apr. 5, 2016

(54) THERMALLY ASSISTED RECORDING HEAD UTILIZING LASER LIGHT WITH LIMITED WAVELENGTH RANGE

(71) Applicant: TDK Corporation, Chuo-ku, Tokyo (JP)

(72) Inventors: Shinji Hara, Tokyo (JP); Tsutomu Chou, Tokyo (JP); Koji Shimazawa, Tokyo (JP); Eiji Komura, Tokyo (JP); Seiichi Takayama, Tokyo (JP); Yasuhiro Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 22 days.

(21) Appl. No.: 13/830,910

(22) Filed: Mar. 14, 2013

(65) Prior Publication Data
US 2014/0269233 A1    Sep. 18, 2014

(51) Int. Cl.
| | | |
|---|---|---|
| *G11B 11/00* | (2006.01) | |
| *B01J 19/12* | (2006.01) | |
| *G11B 5/31* | (2006.01) | |
| *G11B 5/60* | (2006.01) | |
| *G11B 5/00* | (2006.01) | |

(52) U.S. Cl.
CPC .............. *G11B 5/314* (2013.01); *G11B 5/6088* (2013.01); *G11B 2005/0021* (2013.01)

(58) Field of Classification Search
CPC ............ G11B 5/314; G11B 11/10534; G11B 11/10543; G11B 11/1058; G11B 2005/0021; G11B 5/105; G11B 5/59677; G11B 5/6088; G11B 5/743; G11B 7/1203; G11B 5/4866; G11B 5/1278; B82Y 10/00; G02B 2006/121; G02B 6/12002; G02B 6/1226; G02B 6/4291
See application file for complete search history.

(56) References Cited

U.S. PATENT DOCUMENTS

| | | | |
|---|---|---|---|
| 5,199,090 A * | 3/1993 | Bell | ............................. 385/33 |
| 6,768,556 B1 | 7/2004 | Matsumoto et al. | |
| 8,670,294 B1 * | 3/2014 | Shi | .......................... G11B 5/314 360/59 |
| 8,787,129 B1 * | 7/2014 | Jin | .......................... G02B 6/105 369/13.13 |
| 2004/0081031 A1 | 4/2004 | Saga et al. | |
| 2010/0091618 A1 * | 4/2010 | Schabes et al. | ............ 369/13.02 |
| 2010/0103553 A1 | 4/2010 | Shimazawa et al. | |
| 2011/0038235 A1 * | 2/2011 | Matsumoto et al. | ....... 369/13.17 |
| 2011/0158575 A1 * | 6/2011 | Craighead et al. | ................ 385/3 |
| 2012/0008470 A1 | 1/2012 | Shimazawa et al. | |
| 2012/0307398 A1 * | 12/2012 | Kanbe et al. | .................... 360/75 |
| 2013/0223196 A1 * | 8/2013 | Gao et al. | .................... 369/13.24 |
| 2014/0133283 A1 * | 5/2014 | Maletzky | ............... G11B 5/314 369/13.33 |

FOREIGN PATENT DOCUMENTS

| | | |
|---|---|---|
| JP | 10-162444 A | 6/1998 |
| JP | 2001-255254 A | 9/2001 |

* cited by examiner

*Primary Examiner* — Dionne H Pendleton
(74) *Attorney, Agent, or Firm* — Posz Law Group, PLC

(57) ABSTRACT

A thermally assisted magnetic recording head includes core that propagates laser light as propagation light, a near-field light generator that faces a portion of the core and extends to an air bearing surface (ABS), the near-field light generator coupled to the propagation light propagating through the core so as to generate a surface plasmon, propagating the surface plasmon to an end part facing the ABS, and generating near-field light at the end part to irradiate the near-field light to a magnetic recording medium, a main magnetic pole layer provided in the vicinity of the near-field light generator where an end part is positioned on the ABS, a laser diode that generates laser light of wavelength 890 nm to 1,000 nm and enters the laser light into the core, and a photodiode provided on a silicon substrate measures an intensity of the laser light entering from the laser diode to the core.

13 Claims, 7 Drawing Sheets

Fig. 5. Spectral dependences of the imaginary part $\varepsilon_2$ of the diagonal permittivity tensor component plotted for unannealed (empty symbols) and annealed (filled symbols) $(FePt)_{1-x}(SiO_2)_x$ granular films.

THERMALLY ASSISTED RECORDING HEAD UTILIZING LASER LIGHT WITH LIMITED WAVELENGTH RANGE

BACKGROUND OF THE INVENTION

1. Field of the Invention

The present invention relates to a thermally assisted magnetic recording head and particular configuration of laser diode unit.

2. Description of the Related Art

Recently in the magnetic recording apparatus which representative the magnetic disk apparatus, the improvement performance of the magnetic recording medium and the thin film magnetic head is required with high density recording. Regarding the thin film magnetic head, the composite-type thin film magnetic head that is stacked with reproducing head with the magnetic resistive effect element for reading and recording head with induction-type electromagnetic transducer element for writing, have been widely used.

The magnetic recording medium is the discontinuous medium on which the magnetic nanoparticles aggregate. Each magnetic nanoparticle has the single magnetic domain structure. Each recording bit on the magnetic recording medium is configured by plural magnetic nanoparticles. To increase the recording density, unevenness at a boundary between neighboring bits must be decreased. For the purpose, it is necessary to make the magnetic nano particles small. On the other hand as for the small magnetic nanoparticle, in other words the small magnetic nanoparticle of the small volume, heat stability of the magnetization decreases. To solve this problem it is effective to increase the anisotropic energy of the magnetic nanoparticle. However, the big anisotropic energy of the magnetic nanoparticle increases the coercive force of the magnetic recording medium and makes recording the information with the conventional magnetic head difficult.

As the method to solve this problem, a so-called thermally assisted magnetic recording is proposed. In this method the magnetic recording medium with large coercive force can be used. On recording the information, by simultaneously applying the magnetic field and heat to the part of the magnetic recording medium which is recorded the information, the temperature of the part is increased. Thereby the information is recorded by magnetic field in the part of which its coercive force is reduced. Hereinafter, the magnetic head used in the thermally assisted magnetic recording is named the thermally assisted magnetic recording head.

In the thermally assisted magnetic recording, the laser light source is generally used as a means to apply heat in the magnetic recording medium. Laser light is converted into near-field light and near-field light heats the magnetic recording medium. Near-field light is a type of electromagnetic field formed around material, and does not have limitation of diffraction limit from the light wavelength. By irradiating light of which wavelength is harmonious to the microstructure body, the near-field light depending on the scale of a microstructure body is formed. As a result, it is possible to narrow light to the very small domain of the dozens of nanometers.

JP. Patent Publication No. 2001-255254 discloses the thermally assisted magnetic recording head using near-field light probe formed of metal piece that is so-called plasmon antenna. The plasmon antenna generates the near-field light from the plasmon excited by light. But because the greater part of the energy of the irradiated light is reflected in the surface or converted into heat energy, the conversion efficiency is low. Because the size of the plasmon antenna is set in lower than wavelength of the light, the volume is small and temperature increase caused with heat generation is very intense. Therefore, the plasmon antenna is prone to produce diffusion, cohesion, fusion and does not have enough reliability.

U.S. Patent Publication No. 2010/0,103,553 discloses the thermally assisted magnetic recording head using the near-field light generator. The near-field light generator is positioned apart from the waveguide and is coupled with the waveguide in surface plasmon polariton mode. That is to say, the total reflection of light propagating on the interface of the waveguide generates the evanescent light penetrating from the interface. The surface plasmon is excited on the surface of the near-field light generator by coupling this evanescent light with collective oscillation of the charge on the near-field light generator, namely the surface plasmon. The surface plasmon excited on the near-field light generator is propagated into the end part located on the air bearing surface S through the propagation edge and generates the near-field light at the end part. Because the near-field light generator is not irradiated with the light propagating in the waveguide, the near-field light generator is prevented from being excessively heated. The wavelength of the laser light that is entered to the wavelength is within 375 nm to 1,700 nm.

In the near-field light generator which uses the coupling of surface evanescent light and surface Plasmon, an excessive temperature increase is not likely to occur. But to realize long-term reliability which is required in the magnetic recording apparatus or the magnetic head, further improvement is demanded. The thermally assisted magnetic recording head is more disadvantageous in a cost view than the conventional magnetic recording head without the heating means to a magnetic recording medium.

This invention is intended to provide a thermally assisted magnetic recording head in which the excessive temperature increase of the near-field light generator is not likely to occur and the influence on cost is suppressed.

SUMMARY OF THE INVENTION

A thermally assisted magnetic recording head of the present invention includes a core that propagates laser light as propagation light, a near-field light generator that faces a portion of the core and extends to an air bearing surface, the near-field light generator being coupled to propagation light propagating through the core in a surface plasmon mode so as to generate a surface plasmon, propagating the surface plasmon to an end part facing the air bearing surface, generating near-field light at the end part so as to irradiate the near-field light to a magnetic recording medium, a main magnetic pole layer that is provided in the vicinity of the near-field light generator and of which an end part is positioned on the air bearing surface, a laser diode that generates laser light of wavelength 890 nm to 1,000 nm and enters the laser light into the core, and a photodiode that is provided on a silicon substrate and measures an intensity of the laser light entered from the laser diode to the core.

Although a photodiode provided on a Si substrate, so called silicon photo diode (Si PD), is reasonable (low cost), its practical upper limit of a detectable wavelength is 1,000 nm. On the other hand, the smaller a wavelength of laser light is, the lower a proportion of a temperature raise of a magnetic recording medium with respect to a temperature raise of an near-field light generator becomes. The smaller a wavelength of laser light is, the greater the temperature raise of the near-field light generator becomes. In this light, it is preferred that the wavelength of the laser light is 890 nm or more. Accordingly, by limiting a wavelength range of the laser light within 890 nm to 1,000 nm, it is possible to use a reasonable Si PD and to suppress a temperature raise of the near-field light generator. Thereby, according to the present invention, it is possible to provide a thermally assisted recording magnetic head by which an effect for the cost is reduced and in which an excessive temperature raise of the near-field light generator hardly occurs.

The above and other objects, features, advantages of the present invention will be disclosed by the following description referring attached drawings exemplarily illustrating the present invention.

DETAILED DESCRIPTION OF THE INVENTION

Figure 1:
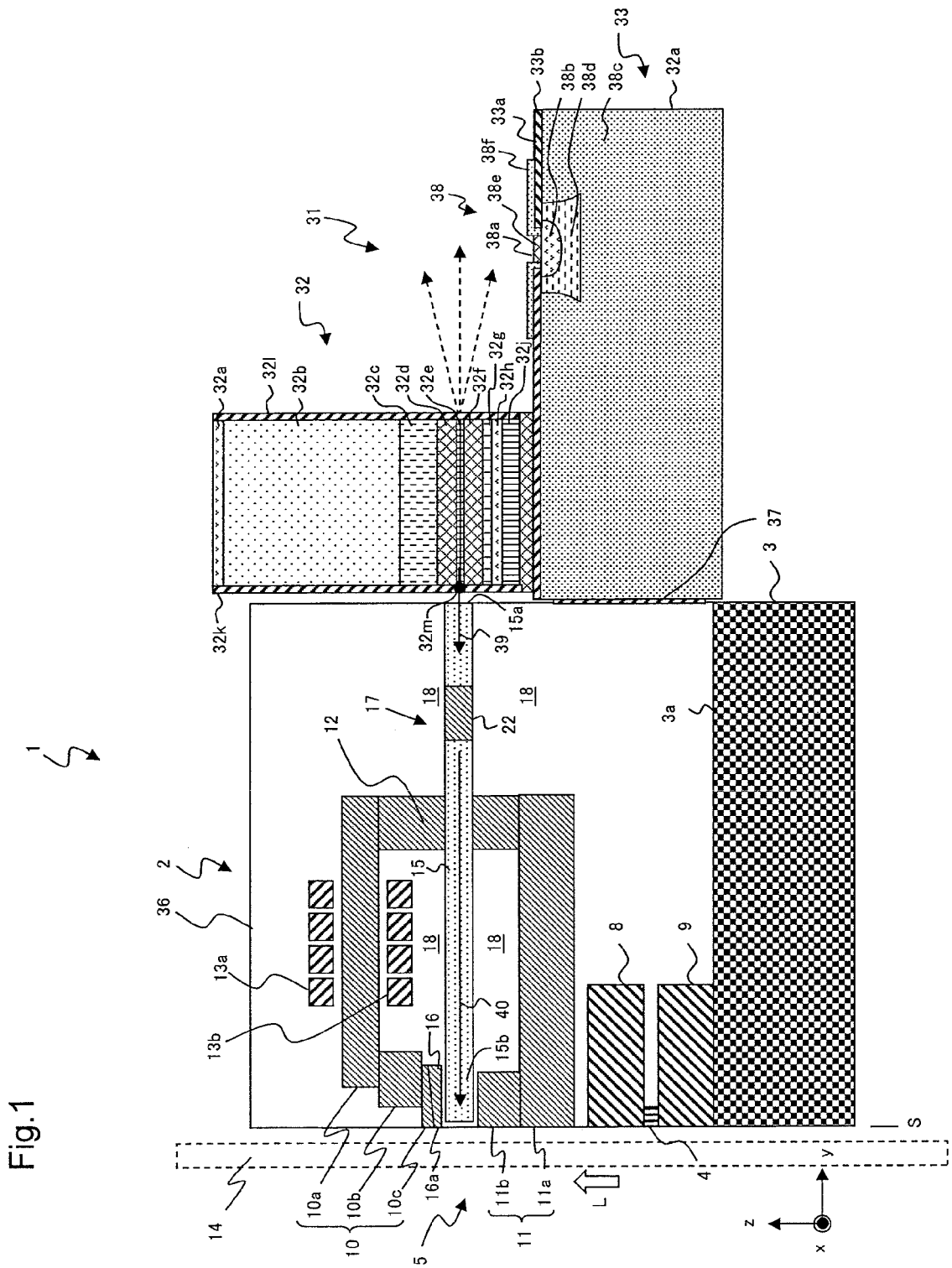
FIG. 1 is a conceptual cross sectional view of the thermally assisted magnetic recording head to which the present invention is applied.
Figure 2A:
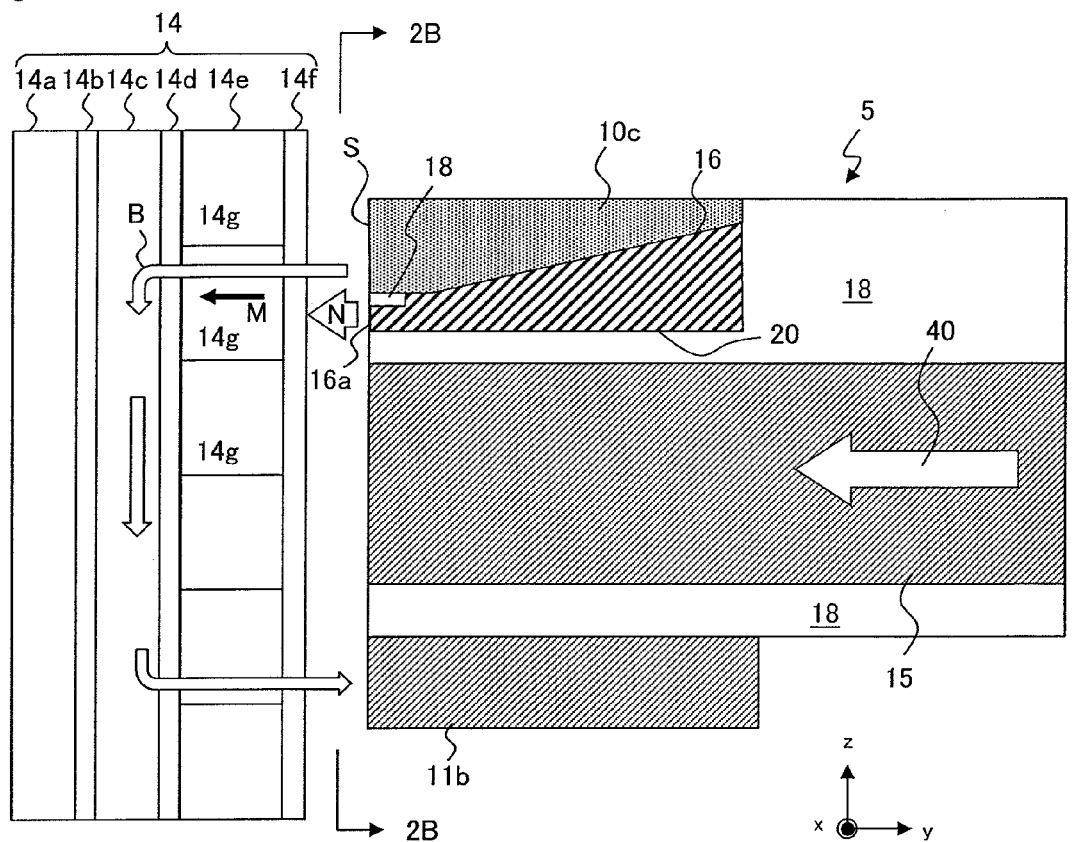
FIG. 2A is a main portion cross sectional view of the thermally assisted magnetic recording head illustrated in FIG. 1.
Figure 2B:
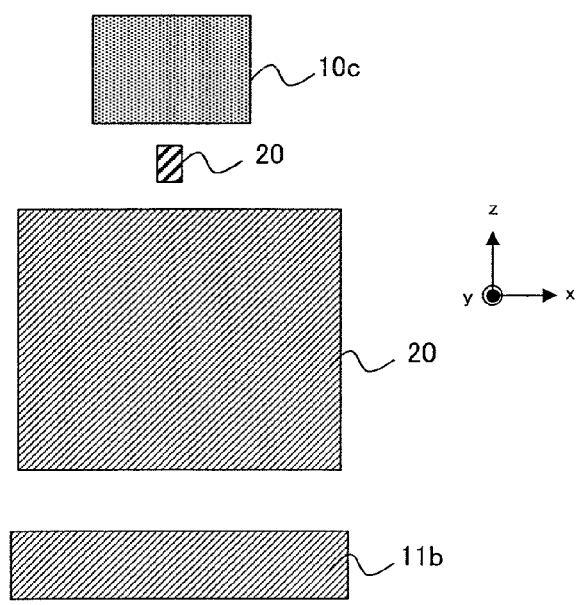
FIG. 2B is a main portion side view of an air bearing surface S of the thermally assisted magnetic recording head illustrated in FIG. 1.

A thermally assisted magnetic recording head of the present invention is explained with reference to the drawings. FIG. 1 is a conceptual cross sectional view of the thermally assisted magnetic recording head. FIG. 2A is a main portion cross sectional view of the thermally assisted magnetic recording head and a magnetic recording media. FIG. 2B is a main portion side view of an air bearing surface S of the thermally assisted magnetic recording head from the perspective of the 2B-2B line of FIG. 2A. In the present specification, the "x" direction means a truck width direction of magnetic recording medium 14, the "y" direction means a direction perpendicular to the air bearing surface S of a magnetic head slider 2, the "z" direction means a direction perpendicular to a major plane 3a of substrate 3 (the major plain 3a meaning a surface on which an MR (Magneto Resistive) element 4, a magnetic recording element 5 and the like are formed). The "z" direction accords with the film formation direction L in the wafer process or the relative movement direction of the magnetic head slider with respect to the truck circumferential direction of the magnetic recording medium 14. The "x" direction, "y" direction, "z" direction are at right angles each other. "The upper direction" and "the lower direction" in the z direction mean a direction getting closer to the substrate 3 and a direction going away from the substrate 3 respectively.

The magnetic head slider 2 is approximately hexahedron. The one side of those forms the air bearing surface S facing the magnetic recording medium 14. On the substrate 3 (wafer) of the magnetic head slider 2, the MR element 4, a magnetic recording element 5, a waveguide 17 and a near-field light generator 16 and like, which are explained later, are formed. The substrate 3 is made of AlTiC.

The magnetic head slider 2 includes the MR element 4 of which the front end portion is positioned at the air bearing surface S, an upper part shield layer 8 and a lower part shield layer 9 which are respectively provided on both sides of the z direction of MR element. The MR element 4 may be one selected form CIP (Current In Plane)-GMR (Gigantic Magneto Resistive) element of which a sense current flows through the z direction, CPP (Current Perpendicular to Plane)-GMR (Gigantic Magneto Resistive) element of which a sense current flows through the z direction and TMR (Tunneling Magneto Resistive) element using Tunneling effect of which a sense current flows through the z direction. When the MR element 4 is CPP-GMR element or TMR element, the upper part shield layer 8 and lower part shield layer 9 are used as the electrodes to supply the sense current.

The magnetic head slider 2 is equipped with a magnetic recording element 5 for perpendicular magnetic recording. The magnetic recording element 5 includes a main magnetic pole layer 10 for recording. The main magnetic pole layer 10 is provided adjacent to the near-field light generator 16 and the end part is positioned in the air bearing surface S. The main magnetic pole layer 10 includes a first main part 10a, a second main part 10b and a magnetic pole front end part 10c, and these are formed of an alloy that is made of any two or three selected from Ni, Fe, and Co. The magnetic pole front end portion 10c, which is an end part of the main magnetic pole layer, is positioned in the air bearing surface S. The return shield layer 11 is provided at the lower side of the main magnetic pole layer 10 in the z direction. The return shield layer 11 includes the first main part 11a and the second main part 11b. These also are formed of an alloy consisting of two or three selected from Ni Fe, and Co or the like. The main magnetic pole layer 10 and the return shield layer 11 are magnetically linked to each other in a contact part 12. In the present embodiment, the return shield layer 11 is provided at the lower side of the main magnetic pole layer 10 in the z direction and can be provided at the upper side of the main magnetic pole layer 10 in the z direction. An overcoat layer 36 made of $Al_2O_3$ is provided at the upper side of the main magnetic pole layer 10 in the z direction.

In the periphery of the main magnetic pole layer 10, coils 13a and 13b wound around the contact part 12 as their center. Due to an electric current applied from the outside to the coils 13a, 13b, a magnetic flex is generated in the main magnetic pole layer 10. The magnetic flex generated in the main magnetic pole layer 10 is emitted from the magnetic pole front end part 10c, which is positioned in the air bearing surface S, toward the magnetic recording media 14 as a magnetic flex for writing. The magnetic flex which goes through the magnetic recording media 14 is absorbed in the return shield layer 11.

The magnetic head slider 2 has a waveguide 17 which is able to propagate the laser light. The waveguide 17 has a core 15 extending to the y direction and a cladding 18 covering up the core 15.

The core 15 propagates laser light 39 generated in a laser diode unit 31 as propagation light 40 into the y direction. The core 15 extends from an end part 15a (an incident part of laser light) that faces the laser diode unit 31 on the magnetic head slider 2 to the air bearing surface S or the vicinity thereof. The core 15 may terminate just before the air bearing surface S or may extend to the air bearing surface S. The cross section of the core 15 perpendicular to the propagation direction (y direction) of the propagation light 40 is rectangular, and the width (a size of the x direction) is bigger than the thickness (a size of the z direction). The core 15 can be made of for example TaOx. Herein, $TaO_x$ means tantalum oxide with arbitrary composition, which is typically $Ta_2O_5$, TaO, $TaO_2$, and the like; however, is not limited to those.

The core 15 is covered with the cladding 18 which has smaller refractive index than the core 15. The cladding 18 can be made of for example $SiO_2$ or $Al_2O_3$.

The magnetic head slider 2 includes the near-field light generator 16 which generates near-field light on the air bearing surface S from the propagation light 40. As the near-field light generator 16 faces a portion of the core 15, the near-field light generator 16 extends, along the core 15, to an end part 16a facing the air bearing surface S in the y direction. The near-field light generator 16 generates the near-field light on the air bearing surface S. Thereby the recording part of the magnetic recording medium 14 is heated. The near-field light generator 16 is made of Au, Ag, Cu, Al, Pd, Ru, Pt, Rh, Ir or an alloy that is composed mainly of these metals. The near-field light generator 16 is a metal piece in a substantially triangular prism shape having a triangular cross section. Of three edges of the near-field light generator 16 extending to the y direction, the edge facing the core 15 configures a propagation edge 20. The propagation edge 20 couples to the propagation light 40 propagating through the core 15 in a surface plasmon mode, generating the surface plasmon. The propagation edge 20 propagates the generated surface plasmon to the end part 16a of the near-field light generator 16, generating near-field light N on the air bearing surface S.

A laser diode unit 31 is positioned on a surface that is opposite side to the air bearing surface S of the magnetic head slider 2. The laser diode unit 31 emits a laser light 39 in the y direction toward the waveguide 17 of the magnetic head slider 2. The laser diode unit 31 is soldered to the magnetic head slider 2 by an adhesion layer 37.

The laser diode unit 31 includes a laser diode (or light emitting diode) 32 and a submount 33 on which the laser diode 32 is mounted. The laser diode 32 is mounted on a mount surface 33a of the submount 33. The submount 33 is made with a Si substrate and the upper surface is covered with an insulting layer 33b made of $SiO_2$.

The laser diode 32 is an edge emitting type. For the laser diode 32, it is possible to use several types of diode, for example, diodes of InP system, GaAs system and GaN system which are used for communication, an optical system disk storage, or a material analysis. The laser diode 32 is not limited the following configuration. However, one example is a stack which is sequentially laminated a n-electrode 32a, a n-GaAs substrate 32b, a n-InGaAlP cladding 32c, a first InGaAlP guide layer 32d, a active layer 32e of multiple quantum well (InGaP/InGaAlP) and the like, a second InGaAlP guide layer 32f, a p-InGaAlP cladding 32g, a p-electrode under layer 32h and p electrode 32j. In a front and behind cleavage planes of the laser diode 32, a reflection layer 32k, 32l to activate an oscillation by the total reflection are formed. An emission center 32m is present at a position of the active layer 32e of the reflection layer 32k.

Because the laser diode 32 is semiconductor, the output of light intensity is greatly changed by the unevenness of the element if even same power is inputted. Then it is preferable to supply drive current, which is controlled to generate laser light of the appropriate output, into the laser diode 32. In the laser diode of the edge emitting type, because laser light is emitted from the end part of the opposite side of an emission center 32m of active layer 32e (or a farther side from the magnetic head slider 2) as illustrated in the broken line in FIG. 1, it is possible to assess the intensity of laser light emitted from the emission center 32 m by detecting the intensity of the laser light.

To detect the intensity of the laser light, the laser diode unit 31 includes a photodiode 38. The photodiode 38 is silicon photodiode (Si PD) formed on a Si substrate. The photodiode 38 is formed on the submount 33, and the surface 33a that is the mounted face of the submount 33 is a light reception surface 38a. The submount 33 is electrically connected to a cathode electrode (not illustrated) of the photodiode 38. The photodiode 38 includes a p-type semiconductor layer 38b and an n-type semiconductor layer 38c, which are formed by doping an impurity with high density into the Si substrate, and an i-type semiconductor layer 38d (intrinsic semiconductor layer), which is interposed between these semiconductor layers 38b and 38c and has a low impurity density. The p-type semiconductor layer 38b is positioned on the light reception surface 38a side and is covered with a anti-reflection coating film 38e. The p-type semiconductor layer 38b is connected to an anodal electrode 38f, and the n-type semiconductor layer 38c is connected to a cathode electrode (not illustrated). The p-type semiconductor layer 38b and the i-type semiconductor layer 38d are covered with an insulation film 33b made of $SiO_2$, and the anodal electrode 38f is formed on the top.

When a photon having bigger band gap energy than that of the i-type semiconductor layer 38d is irradiated, a pair of electron and positive hole is generated in the i-type semiconductor layer 38d by light absorb. When a reverse bias voltage has been applied to the photodiode 38 in advance, the electron and the positive hole are respectively swept in the opposite directions by the electric field, the electron moves toward the n-type semiconductor layer 38c and the positive hole moves toward the p-type semiconductor layer 38b, and a photoelectric current is generated.

The magnetic recording medium 14 is for the perpendicular magnetic recording and has a multilayer structure in which a magnetization orientation layer 14b, a soft magnetic under layer 14c serving as a part of the magnetic flux loop circuit, an intermediate layer 14d, a magnetic recording layer 14e and a protective layer 14f are sequentially laminated on a disk substrate 14a. The magnetic recording layer 14e is formed of FePt—$SiO_2$.

The magnetization orientation layer 14b stabilizes the magnetic domain structure of the soft magnetic under layer 14c by applying a magneto anisotropy that is in a track width direction to the soft magnetic under layer 14c. Thereby, the spikes-like noise in the reproduction output wave pattern is controlled. The intermediate layer 14d is an under layer of the magnetic recording layer 14e and controls an orientation of the magnetization and a particle size.

The magnetic flux B emitted from the magnetic pole front end part 10c enters into the magnetic recording medium 14 and successively magnetizes each of recording bits 14g (M in Fig.) in a vertical direction (y direction). The magnetic flux B changes the magnetic path into the in-plane direction (z direction) of the magnetic recording medium 14, further changes the magnetic path into the vertical direction (y direction) again in the vicinity of the return shield layer 11 and is absorbed into the return shield layer 11. By superimposing the near-field light N on the magnetic flux B emitted from the magnetic pole front end part 10c, the coercive force of the magnetic recording layer 14e can be effectively reduced. As a result, it is possible to greatly reduce a recording magnetic field intensity in the vertical direction (y direction) that is required for writing. Because a magnetization inversion becomes easy to occur by reducing the coercive force, it is possible to efficiently perform the recording with a small recording magnetic field.

The thermally assisted magnetic recording head 1 can be formed in the following processes.
(1) The lower part shield layer 9, the MR (Magneto Resistive) element 4, and the upper part shield layer 8 are sequentially formed.
(2) The return shield layer 11 is provided.
(3) The cladding 18 is provided.
(4) The core 15 is provided and the side part is embedded by the cladding 18
(5) The cladding 18 is provided on the top of the core 15.
(6) The near-field light generator 16 is formed on the cladding 18.
(7) The cladding 18 is formed at sides of and on the near-field light generator 16.
(8) The main magnetic pole layer 10 is provided.
(9) The overcoat layer 36 is provided.
(10) The wafer is cut out into the multi magnetic head sliders 2.
(11) Each of the magnetic head slider 2 is bonded to a suspension and a head gimbal assembly is made.
(12) In order to couple the waveguide 17 with laser light, the laser diode 32 is linked to the waveguide 17.

Next, the laser light wavelength that is applied to the present invention is explained. First, a calculation model that imitates/simulates the shapes of the magnetic recording element 5 (only partly illustrated) and the magnetic recording medium 14 illustrated in FIG. 2A, 2B is built. The distributions of light and heat were sought by the finite element method. The magnetic recording layer 14e was formed of FePt—$SiO_2$. The wavelength of the laser light emitted from the laser diode 32 was changed as a parameter.

Under a condition where the laser light of constant energy was coupled to waveguide, the temperature increase $\Delta t1$ of the magnetic recording layer 14e and the temperature increase $\Delta t2$ of the near-field light generator 16 were calculated. The ratio $\Delta t1/\Delta t2$ was calculated as media/head temperature rise ratio (m/h TRR). In the thermally assisted recording, it is necessary to increase the temperature of the magnetic recording layer 14e into approximately Curie temperature of the magnetic recording layer. For example in the case of environmental temperature 50 degrees Celsius and Curie temperature 350 degrees Celsius, it is necessary to increase the temperature of the magnetic recording layer 14e by 300 degrees Celsius ($\Delta t1=300°$ C.). When the m/h TRR is 3, the temperature of the near-field light generator 16 increases by 100 degrees Celsius ($\Delta t2=100°$ C.) and becomes 150 degrees Celsius.

Figure 3:
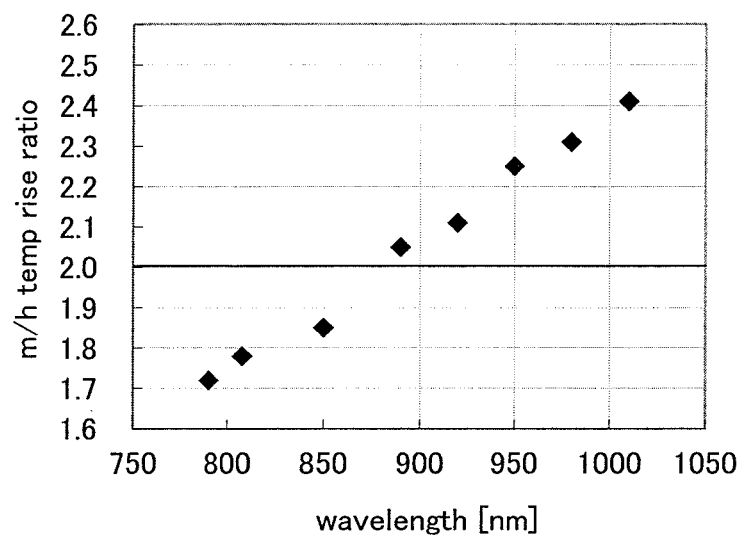
FIG. 3 is a view illustrating the wavelength dependency of the laser light in m/h temp rise ratio (TRR).

The laser wavelength dependency of the m/h TTR which is defined in this way is illustrated in FIG. 3. In the wavelength range of 790-1,050 nm, in accordance with the increase of the wavelength, the m/h TTR monotonically increases. From the viewpoint of practical use, the m/h TRR>2.0 is one index. In the wavelength of more than 890 nm, this index is met, and the temperature suppressant effect of the near-field light generator 16 is expected.

A lifetime test of the thermally assisted magnetic recording head was carried out to inspect the validity of the calculation result. The five thermally assisted magnetic recording heads which had the same configuration of calculation model and were linked to the laser diode of the wavelength 808 nm were made. The logarithmic mean lifetimes were calculated. Likewise the five thermally assisted magnetic recording heads which had the same configuration of calculation model and were linked to the laser diode of the wavelength 950 nm were made. The logarithmic mean lifetimes were calculated. The lifetime was defined as a period that is necessary for the SN ratio to deteriorate from an initial value by 2 dB. By the calculation, temperature increase $\Delta t2$ of the near-field light generator 16 of a sample using the laser diode of wavelength 950 nm was 79% of temperature increase $\Delta t2$ of another sample using the laser diode of wavelength 808 nm (the m/h TRR becomes 126%). The difference of temperature increase $\Delta t2$ is equivalent with lifetime increase of 7.0 times greater from Arrhenius plot of the lifetime.

As illustrated in table 1, the logarithmic mean of the lifetime of the sample of the laser diode with wavelength 950 nm was 243 hrs, which was 7.8 times as large as the logarithmic mean, 31 hrs, of the lifetime of the sample of the laser diode with wavelength 808 nm. The matching between the calculation and the actual measurement is good and the wavelength dependency of laser light of m/h TRR that is anticipated by the calculation is highly reliable. In short, at least, in a range of 790 to 1,050 nm, the longer the wavelength of the laser light is, the longer lifetime and the higher reliability are obtained.

TABLE 1

|  | lifetime [hours] |
|---|---|
| 808 nm 1 | 18 |
| 808 nm 2 | 37 |
| 808 nm 3 | 50 |
| 808 nm 4 | 20 |
| 808 nm 5 | 41 |
| logarithmic mean | 31 |
| 950 nm 1 | 197 |
| 950 nm 2 | 250 |
| 950 nm 3 | 299 |
| 950 nm 4 | 122 |
| 950 nm 5 | 474 |
| logarithmic mean | 243 |

Figure 4:
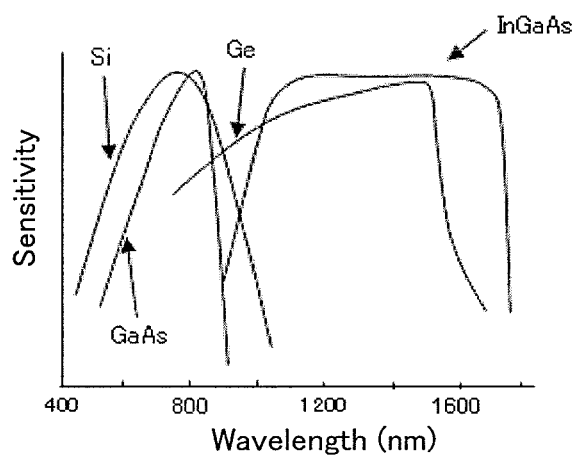
FIG. 4 is a view illustrating the wavelength dependency of the laser light in the sensitivity of the light detection of the Si PD.

In the other hand, as the above-described, at the actual thermally assisted recording process, it is extremely desirable to control the optical power of the laser diode 32 by regularly monitoring the optical power of the laser diode 32 and by using a feedback mechanism. It is desirable to use cheap Si PD as the photodiode 38 that is used for the detection of the optical power of the laser diode 32, when considering its cost. However, the Si PD has a detectable wavelength range and the usable wavelength is limited. FIG. 4 is an example indicating the wavelength dependence of the light detective sensitivity of Si PD. Generally, since a sensitivity of the Si PD is remarkable decreased with respect to a wavelength of 1,000 nm or more, and in order to secure practical detection ability, it is desirable to limit the usage wavelength within a range of 400 to 1,000 nm. From the above, in order to make a high reliability and low cost compatible, it is desirable to use the laser diode of the wavelength with a range of 890 to 1,000 nm.

Figure 5:
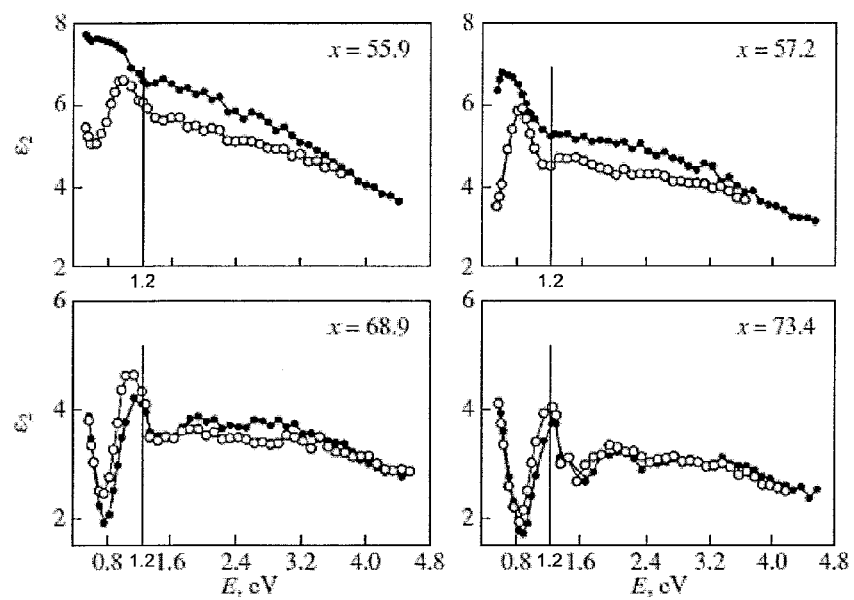
FIG. 5 is a view illustrating the wavelength dependency of the laser light in $\in 2$ (imaginary number ingredients of permittivity) of $(FePt)_{1-x}$—$(SiO_2)_x$.

The reason why m/h TRR increases as the wavelength of the laser light becomes longer is considered. In Optical and Magnetooptical Properties of FePt—$SiO_2$ Magnetic Nanocomposites, E. A. Gan'shina et al. Physics of the Solid State, Vol. 47, No. 9, 2005, pp. 1701-1706, a wavelength dependence of ∈2 (imaginary number ingredients of the dielectric constant) of $(FePt)_{1-x}$—$(SiO_2)_x$ which is made by changing a fraction x of $SiO_2$ is illustrated (see FIG. 5). Among the figure, dotted symbols show values after annealing, empty symbols show values before annealing. The wavelength range of x=890 to 1,000 nm is equivalent with an energy range of 1.393 to 1.240 eV. As a general tendency in the range of 1.2 eV or more, the imaginary number ingredients of the dielectric constant increase as the wavelength becomes longer (as the energy becomes lower) regardless of a content amount of $SiO_2$. Because a heat generation amount per volume in a material is proportional to the imaginary number ingredient of the dielectric constant, the longer the wavelength of the emitted light is, the greater a heat generation amount in the magnetic recording layer 14$e$ becomes. Namely, the longer the wavelength is, the greater a temperature raise $\Delta t1$ of the recording layer 14$e$ becomes. On the other hand, because the longer the wavelength is, smaller the energy of the wave becomes, the longer the wavelength is, the smaller a temperature raise $\Delta t2$ of the near-field light generator 16 becomes. Therefore, as the wavelength of the laser light is longer, the m/h TRR increases.

Therefore, it is preferable that the imaginary number ingredients of the dielectric constant of materials constituting the magnetic recording layer increases as the wavelength increase, when the laser light was irradiated the magnetic recording layer. It is possible to improve reliability of the next-field light generator 16 by using the magnetic recording medium meeting this condition and choosing a wavelength as long as possible among the preferable wavelength range of 890 nm-1,000 nm. FePt—$SiO_2$ is the materials which can improve the reliability of the near-field light generator without depending on the composition ratio (fraction x) as the wavelength of the laser light is long in a detective range (~1,000 nm) of Si PD. It can be suitably applied to the present invention.

In order to link the propagation light 40 propagating in the core 15 with the near-field light generator 16 in the surface plasmon mode, it is necessary for the propagation light 40 to be TM polarization wave. However generally it is difficult to generate laser light of the TM polarization by the laser diode 32 in above-described wavelength area of 890~1000 nm. Laser lights of the TE polarization are usually generated in this wavelength area. Therefore it is preferable to provide a polarization direction transducer 22 in the middle of core 15 specifically between a facing part 15$b$ facing the near-field light generator 16 and the incident part 15$a$ of the core 15 as illustrated in FIG. 1, the polarization direction transducer 22 converting the TE polarization laser light into the TM polarization laser light.

Figure 6:
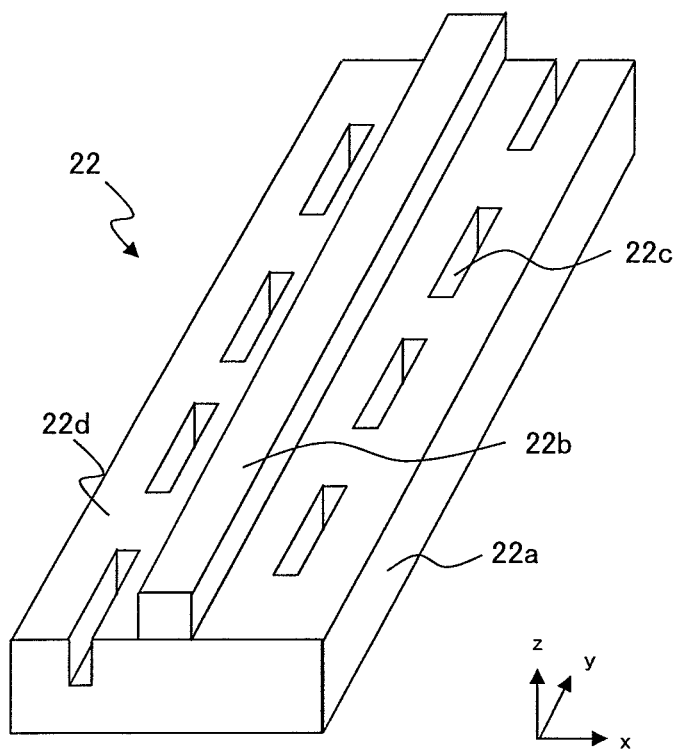
FIG. 6 is a conceptual perspective view illustrating the configuration of the polarization direction transducer.

One example of the polarization direction transducer 22 is illustrated in FIG. 6. The polarization direction transducer 22 includes a core 22$a$ having a cross section same as the core 15 does, a ridge 22$b$ extending parallel to the core 22$a$ on an upper surface 22$d$ of the core 22$a$ in the z direction and formed integrally with the core 22$a$ and grooves or trenches 22$c$ provided on both sides of the ridge 22$b$ on an upper surface 22$d$ of the core 22$a$. The trenches 22$c$ on the both sides are offset each other in the y direction and are provided. The polarization direction transducer 22 with such a configuration can be easily integrated into the core 15 and has little influence on the manufacture process.

Figure 7:
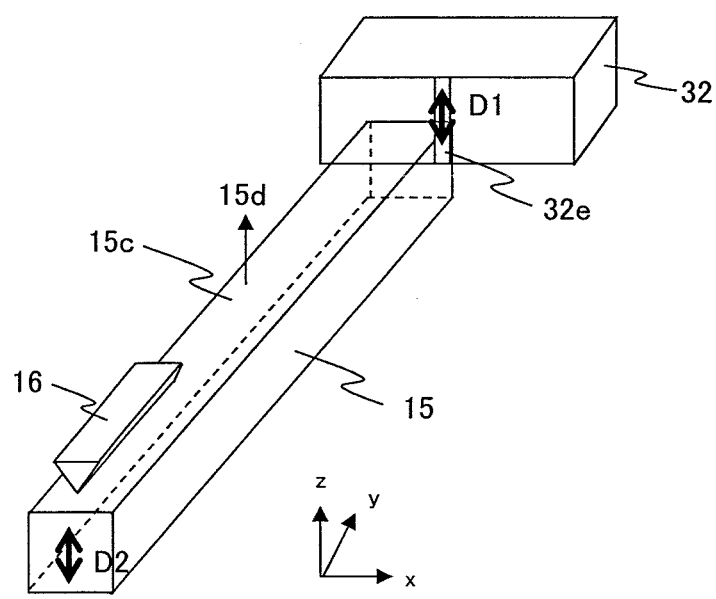
FIG. 7 is a conceptual view illustrating of the thermally assisted magnetic recording head according to variation embodiment of the present invention.

Alternatively, the laser diode generating laser light of the TE polarization is turned by 90 degrees in x-z plane with respect to the embodiment illustrated in FIG. 1 and can be also attached to the magnetic head slider. As illustrated in FIG. 7, the laser diode 32 is fixed to the core 15 so that the electric field oscillation direction D1 of laser light of the TE polarization is parallel to the normal line 15$d$ of a facing surface 15$c$ of the core 15, the facing surface 15$c$ facing the near-field light generator 16. An active layer 32$e$ of the laser diode is open in the z direction. In the present embodiment, because the electric field oscillation direction D1 of the laser light generated by the laser diode 32 matches the electric field oscillation direction D2 of the laser light of the core 15, it isn't required to provide the polarization direction transducer 22 that is discussed above.

Next, the head gimbal assembly on which the thermally assisted magnetic head 1 is mounted is explained.

Figure 8:
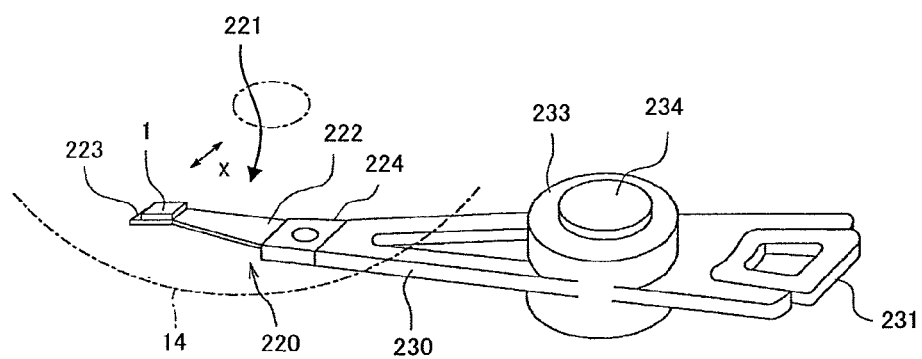
FIG. 8 is a perspective view of the head arm assembly of the present invention.

Referring to FIG. 8, a head gimbal assembly 220 includes the thermally assisted magnetic head 1 and a suspension 221 which elastically supports the thermally assisted magnetic head 1. The suspension 221 includes a leaf spring like a load beam 222 that is formed of stainless steel, a flexure 223 that is arranged in one end part of the load beam 222 and a base plate 224 that is arranged in the other end part of the load beam 222. The thermally assisted magnetic head 1 is bonded to the flexure 223 so that suitable flexibility is given to the thermally assisted magnetic head 1. A gimbal part to keep a constant posture of the thermally assist magnetic head 1 is provided on a portion of the flexure 223 to which the thermally assisted magnetic head 1 is attached.

The assembly that the head gimbal assembly is attached to the arm 230 is referred as a head arm assembly 221. The arm 230 moves the thermally assisted magnetic head 1 to the track crossing direction x of the magnetic recording medium 14. One end part of the arm 230 is attached to the base plate 224. The other end part of the arm 230 is attached to the coil 231 that eventually become a portion of a voice coil motor. The bearing part 223 is provided on the intermediate part of the arm 230. The arm 230 is rotatably supported by a shaft 234 attached to the bearing part 233. The arm 230 and the voice coil motor driving the arm 230 configure an actuator.

Figure 9:
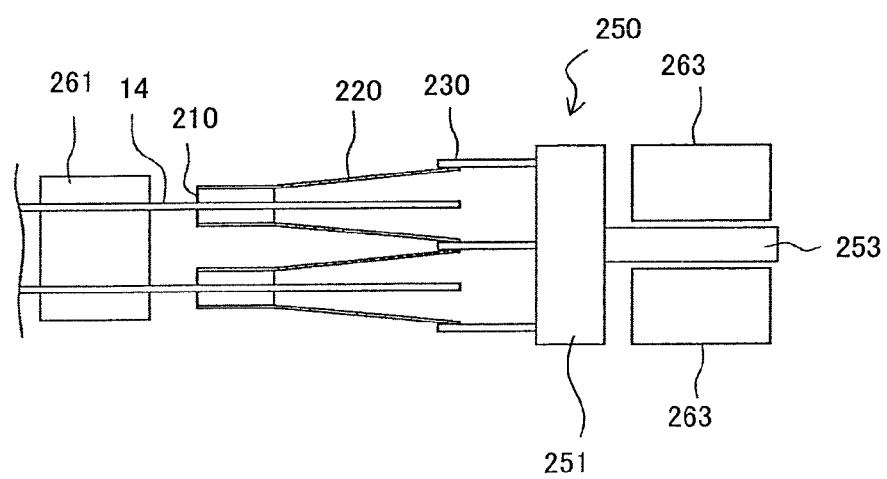
FIG. 9 is a side view of the head stack assembly of the present invention.
Figure 10:
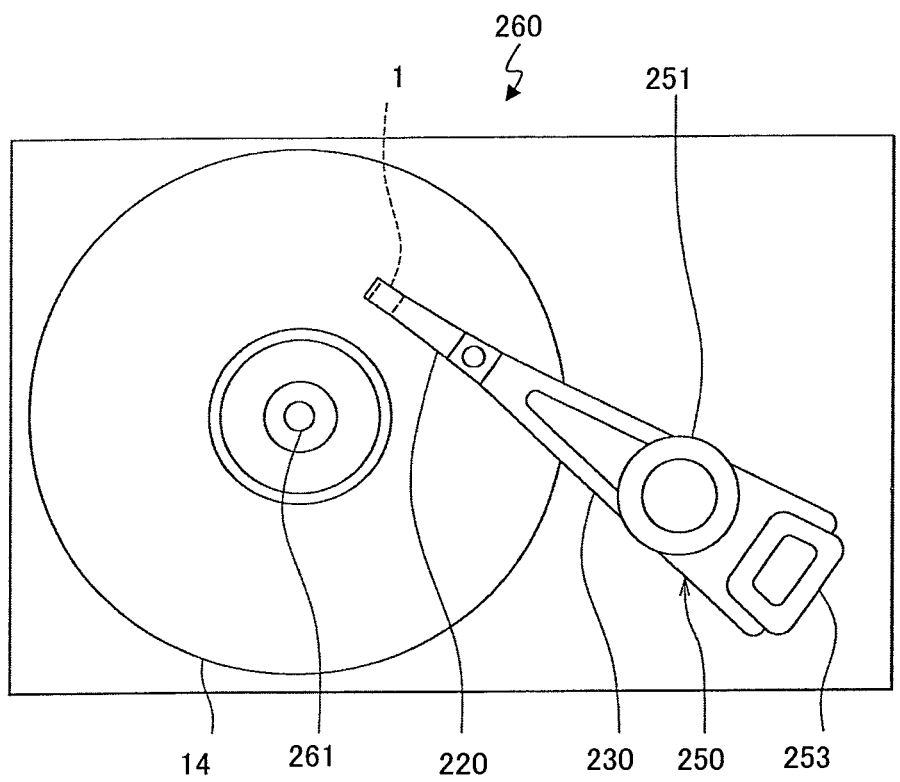
FIG. 10 is a plan view of the magnetic recording apparatus of the present invention.

Next, referring to FIG. 9 and FIG. 10, a head stack assembly and a magnetic recording apparatus in which the above discussed thermally assisted magnetic head 1 is assembled are explained. The head stack assembly is a device in which a head gimbal assembly 220 is attached to each arm of a carriage having plural arms. FIG. 9 is a side view of the head stack assembly of the present invention. FIG. 10 is a plan view of the magnetic recording apparatus. The head stack assembly 250 includes the carriage 251 having the plural arms 230. The head gimbal assembly 220 is attached to each of the arms 230 at an interval each other and is lined up to the vertical direction. The coil 253 which is a part of the voice coil motor is attached to the opposite side of the arm 230 in the carriage 251. The voice coil motor has permanent magnets 263 that are arranged at a position facing each other and sandwiching the coil 253.

Referring to FIG. 10, the head stack assembly 250 is assembled to the magnetic recording apparatus 260. The magnetic recording apparatus 260 includes a plurality of magnetic recording media 14 attached to a spindle motor 261. Two of the thermally assisted magnetic heads 1 are arranged to be faced each other in a manner of sandwiching each of the magnetic recording media 14. The head stack assembly 250 except the thermally assisted magnetic head 1 and an actuator support the thermally assisted magnetic head 1 corresponding to a positioning device, and position the thermally assisted magnetic head 1 with respect to the magnetic recording media 14. The thermally assisted magnetic head 1 is moved with the actuator in the track crossing direction of the magnetic recording media 14, and positioned with respect to the actuator. The thermally assisted magnetic head 1 records information to the magnetic recording media 14 with a magnetic recording element 5 and reproduces information recorded in the magnetic recording media 14 with an MR element 4.

While preferred embodiments of the present invention have been shown and described in detail, and it is to be understood that variety of changes and modifications may be made without departing from the spirit of the attached claims or its scope.

What is claimed is:

1. A thermally assisted magnetic recording head, comprising:
   a main core that propagates laser light as propagation light;
   a near-field light generator that faces a portion of the main core and extends to an air bearing surface, the near-field light generator being coupled to propagation light propagating through the core in a surface plasmon mode so as to generate a surface plasmon, propagating the surface plasmon to an end part facing the air bearing surface, generating near-field light at the end part so as to irradiate the near-field light to a magnetic recording medium;
   a main magnetic pole layer that is provided in the vicinity of the near-field light generator and of which an end part is positioned on the air bearing surface;
   a laser diode that generates laser light of wavelength 890 nm to 1,000 nm and enters the laser light into the main core; and
   a photodiode that is provided on a silicon substrate and measures an intensity of the laser light entered from the laser diode to the main core, wherein
   the laser diode generates TE polarization laser light and enters the TE polarization laser light from an incident part of the main core into the main core,
   the main core includes a polarization direction transducer between a part facing the near-field light generator and the incident part, the polarization direction transducer converting the TE polarization laser light into TM polarization laser light that is passed as the propagation light.

2. A magnetic recording apparatus, comprising:
   the thermally assisted magnetic recording head according to claim 1; and
      a magnetic recording medium that has a magnetic recording layer and is positioned facing the air bearing surface;
   wherein,
   when the laser light of the wavelength of 890 nm to 1,000 nm is irradiated to the magnetic recording layer, the greater the wavelength is, the more imaginary number ingredients of the dielectric constant of materials constituting the magnetic recording layer increase.

3. The magnetic recording apparatus according to claim 2, wherein the magnetic recording layer is formed of FePt—SiO$_2$.

4. A head gimbal assembly, comprising:
   the thermally assisted magnetic recording head according to claim 1; and
   a suspension elastically supporting the thermally assisted magnetic recording head; wherein,
   the suspension, comprising,
      a flexure to which the thermally assisted magnetic head is bonded;
      a load beam of which one end part is connected to the flexure; and
      a base plate that is connected to the other end part of the load beam.

5. A magnetic recording apparatus, comprising:
   the thermally assisted magnetic recording head according to claim 1;
   a recording medium that is positioned facing the thermally assisted magnetic head;
   a spindle motor that rotatably drives the recording medium; and
   a positioning device that supports the thermally assisted magnetic head and that positions the thermally assisted magnetic head with respect to the magnetic recording medium.

6. The magnetic recording apparatus according to claim 1, wherein a transducer core of the polarization direction transducer has a same cross-section as the main core.

7. The magnetic recording apparatus according to claim 1, wherein the polarization direction transducer is located directly between the part facing the near-field light generator and the incident part.

8. The magnetic recording apparatus according to claim 1, wherein the polarization direction transducer further comprises:
   a transducer core having a same cross-section as the main core and extending in a first direction parallel to an upper surface of the transducer core; and
   a ridge formed integrally with the transducer core on the upper surface of the transducer core and extending from the upper surface of the transducer core in a second direction perpendicular to the upper surface of the transducer,
   wherein
   first grooves are provided in the transducer core on a first side of the ridge on the upper surface of the transducer core,
   second grooves are provided in the transducer core on a second side of the ridge on the upper surface of the transducer core, and
   the first grooves are offset from the second grooves in the first direction.

9. A thermally assisted magnetic recording head, comprising:
   a core that propagates laser light as propagation light;
   a near-field light generator that faces a portion of the core and extends to an air bearing surface, the near-field light generator being coupled to propagation light propagating through the core in a surface plasmon mode so as to generate a surface plasmon, propagating the surface plasmon to an end part facing the air bearing surface, generating near-field light at the end part so as to irradiate the near-field light to a magnetic recording medium;
   a main magnetic pole layer that is provided in the vicinity of the near-field light generator and of which an end part is positioned on the air bearing surface;
   a laser diode that generates laser light of wavelength 890 nm to 1,000 nm and enters the laser light into the core; and
   a photodiode that is provided on a silicon substrate and measures an intensity of the laser light entered from the laser diode to the core, wherein
   the laser diode generates TE polarization laser light, and
   the laser diode is fixed to the core so that an electric field oscillation direction of the TE polarization laser light is parallel to a normal line to a facing surface of the core, the facing surface facing the near-field light generator.

10. A magnetic recording apparatus, comprising:
    the thermally assisted magnetic recording head according to claim 9; and
    a magnetic recording medium that has a magnetic recording layer and is positioned facing the air bearing surface;
    wherein,
    when the laser light of the wavelength of 890 nm to 1,000 nm is irradiated to the magnetic recording layer, the greater the wavelength is, the more imaginary number ingredients of the dielectric constant of materials constituting the magnetic recording layer increase.

11. The magnetic recording apparatus according to claim 10, wherein
the magnetic recording layer is formed of FePt—$SiO_2$.

12. A head gimbal assembly, comprising:
the thermally assisted magnetic recording head according to claim 9; and
a suspension elastically supporting the thermally assisted magnetic recording head; wherein,
the suspension, comprising,
  a flexure to which the thermally assisted magnetic head is bonded;
  a load beam of which one end part is connected to the flexure; and
  a base plate that is connected to the other end part of the load beam.

13. A magnetic recording apparatus, comprising:
the thermally assisted magnetic recording head according to claim 9;
a recording medium that is positioned facing the thermally assisted magnetic head;
a spindle motor that rotatably drives the recording medium; and
a positioning device that supports the thermally assisted magnetic head and that positions the thermally assisted magnetic head with respect to the magnetic recording medium.

* * * * *